United States Patent [19]
Behrens

[11] Patent Number: 5,129,387
[45] Date of Patent: Jul. 14, 1992

[54] ANTI-ICE BUILDUP SYSTEM FOR ROOF VENTS AND THE LIKE

[76] Inventor: Walter R. Behrens, Rte. 6, Box 227 Country Club Rd., Minot, N. Dak. 58701

[21] Appl. No.: 629,272

[22] Filed: Dec. 18, 1990

[51] Int. Cl.$^5$ ............................................. F23J 2/08
[52] U.S. Cl. .................................. 126/440; 126/417; 454/367
[58] Field of Search ............... 126/440, 417; 98/61, 98/122, 35, 29; 165/47

[56] References Cited

U.S. PATENT DOCUMENTS

| | | | |
|---|---|---|---|
| 579,308 | 3/1897 | Streby | 98/61 |
| 3,231,004 | 1/1966 | Reed et al. | 98/61 |
| 4,076,014 | 2/1978 | Wiquel | 126/440 |
| 4,224,923 | 9/1980 | Wells | 126/417 |
| 4,252,183 | 2/1981 | Ricciardelli | 126/417 X |
| 4,291,673 | 9/1981 | Deutz | 126/417 |
| 4,307,710 | 12/1981 | Natter | 126/440 |

*Primary Examiner*—Larry Jones
*Attorney, Agent, or Firm*—Moore & Hansen

[57] ABSTRACT

The present invention provides apparatus for substantially preventing the formation of ice or frost in a pipe containing water in vapor or droplet form. The apparatus comprises means for gathering and focussing solar radiation and means for receiving and distributing the radiation to the pipe as heat, thereby providing an ambient temperature in the pipe above the freezing point of water.

36 Claims, 2 Drawing Sheets

ANTI-ICE BUILDUP SYSTEM FOR ROOF VENTS AND THE LIKE

BACKGROUND OF THE PRESENT INVENTION

The present invention relates generally to apparatus for substantially preventing the accumulation of frost or ice within a conduit carrying water in either a vapor or liquid droplet phase.

Certain venting pipes, such as sewer venting pipes and gas furnace venting pipes, both of which often vent through the roofs of houses and buildings, carry water in either a vapor or droplet form. In colder climates, this water may freeze along the interior sides of the conduit in cold weather conditions. Typically, the ice will begin to form along the open end of the vent pipe where the venting gases contact the colder ambient air. If the cold weather lasts a sufficient length of time, the ice accumulation can become so great that the conduit may be blocked and prevented from performing its venting function When the venting pipe is blocked, gases from the sewer or furnace cannot readily escape into the outside environment and instead begin to accumulate indoors These gases can have an unpleasant odor and in certain instances can be of a toxic nature. Additionally, when the particular pipe is a sewer venting pipe, the proper functioning of drains and toilets in the building may be interfered with by the accumulating gases. Thus, a simply installed, easily maintained and affordable system that would substantially prevent the buildup of frost and ice in pipes of this kind would be desirable.

SUMMARY OF THE PRESENT INVENTION

The present invention provides apparatus for substantially preventing the formation of frost and ice in a conduit carrying water in vapor or liquid phase. The apparatus includes a heat supply means comprising means for gathering and focussing solar radiation, means for receiving said focussed solar radiation as heat, and means for distributing the heat to the conduit to provide an ambient conduit temperature above the freezing point of water. In one embodiment, which is useful for a venting pipe from a sewer drain system or a gas furnace, the heat supply means is attached to a pipe extension that in turn is attachable to the venting pipe. In this embodiment the heat is distributed to the pipe extension.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PREFERRED EMBODIMENT

Figure 1:
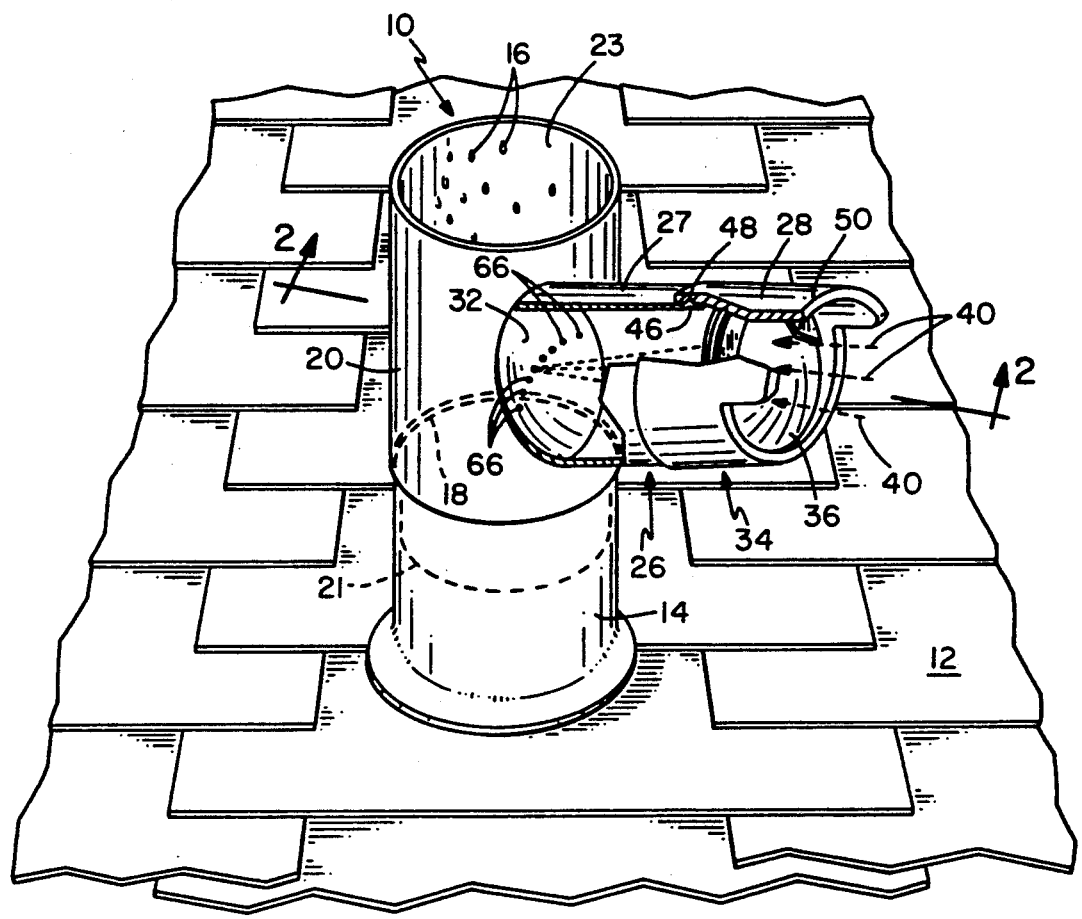
FIG. 1 shows apparatus in accordance with the present invention disposed on a roof top vent pipe.
Figure 2:
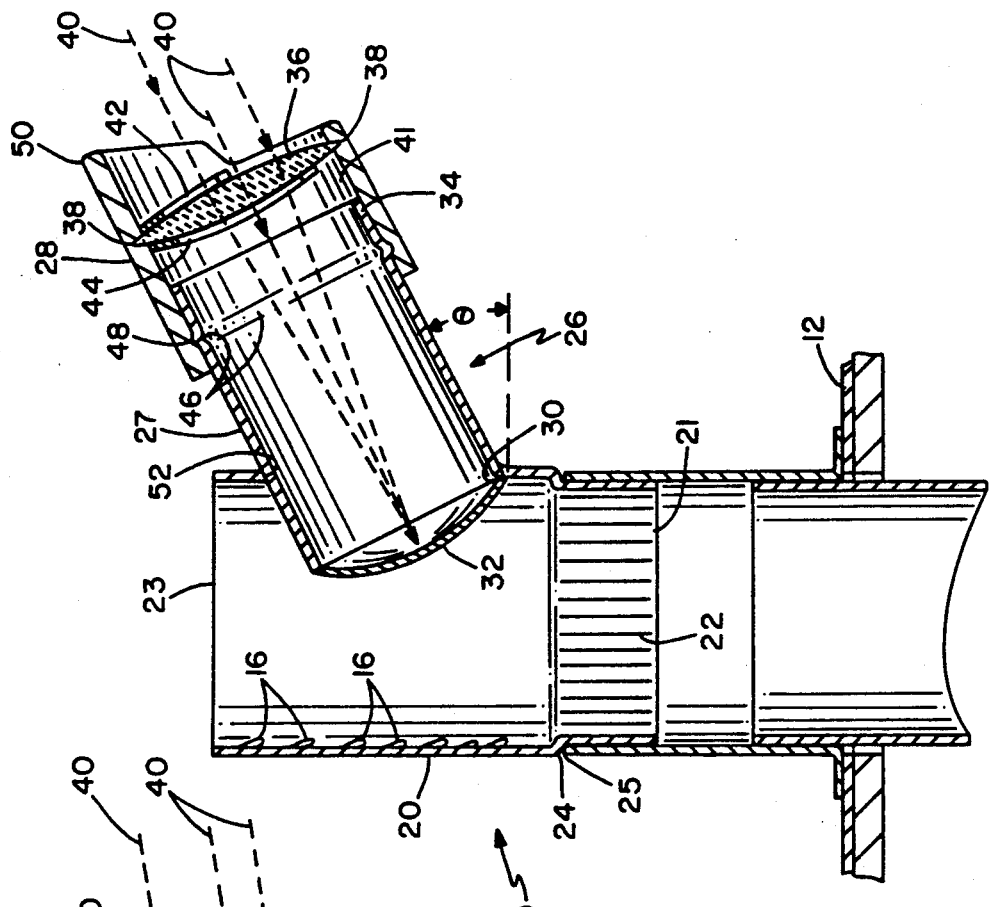
FIG. 2 illustrates in cross section the apparatus shown in FIG. 1 taken along cutting plane 1—1 thereof.

FIGS. 1 and 2 illustrate a heating apparatus 10 in accordance with the present invention disposed on a roof 12 of a building through which a venting pipe or conduit 14 extends Pipe 14 may be connected to a system needing venting, such as a furnace or sewer drain system or the like. Apparatus 10 is attached to pipe 14, which may contain water in vapor or liquid form, as indicated by water droplets 16. Water may be present in the pipe 14 as a combustion byproduct of a furnace burning fossil fuels or as water vapor rising from a sewer. As the water reaches the open end 18 of pipe 14, it is cooled and can condense on the end and interior sides of pipe 14, where it may freeze in cold weather conditions. Eventually, the accumulation of ice and frost may block open end 18. Apparatus 10 is inserted into open end 18.

Apparatus 10 includes an upright pipe or conduit extension 20 having an open end 21, which may include corrugations 22 to allow improved retention of the pipe 20 in conduit 14. Open end 21 is inserted within the upper end of pipe 14 as shown in the Figures and frictionally retained therein. The other or upper end 23 of upright pipe extension 20 is also open, thereby allowing continued venting into the atmosphere from pipe 14 through upright pipe extension 20. Ends 21 and 23 are substantially cylindrical, with end 23 having a larger diameter than end 21. Ends 21 and 23 may have other configurations, though end 21 should have a configuration similar to open end 18 of pipe 14 and be sized to be slidably yet snugly insertable therein. Pipe extension 20 has a shoulder 24 that rests on the lip 25 of end 18 of vent pipe 14 when apparatus 10 is inserted therein.

Apparatus 10 further includes a lens unit 26 comprising a lens pipe 27 and a lens holder 28. Lens pipe 27 has an end 30 sealingly closed by a collector or receiver 32. The other end 34 of lens pipe 28 supports lens holder 28. Lens holder 28 in turn supports means for gathering and focussing solar radiation, such as lens 36. As shown in the Figures, lens 36 is a convex lens and may be a spherical or aspherical lens. Lens 36 has an optical axis and is disposed such that the optical axis of the lens is substantially coincident with the axis of lens pipe 27. Lens 36 is held in place within lens holder 28 by means of a circumferentially extending detents 38 disposed on the inner surface 41 of lens holder 28. Lens 36 may be supported at the front and rear sides thereof by a pair of partially extending circumferentially configured ribs 42 and 44 respectively.

Lens holder 28 is attached to the end of lens pipe 27 by means of an annular rib 46 and cooperating groove 48 respectively. Thus, groove 48, which is disposed on the inner surface of lens holder 28, receives rib 46, which is disposed about outer portion of lens pipe 27. Lens holder 28 may further include a shade 50 that substantially prevents the accumulation of snow on lens 36 during winter months.

Preferably, lens unit 26 is a sealed unit so that water in any phase is incapable of entering the interior of lens pipe 27 and interfering with the focussing of sunlight onto collector 32, such as by clouding the interior concave surface of lens 36. Lens unit 26 is inserted into upright pipe extension 20 through an opening 52 therein and attached by known means such as soldering brazing, riveting, or the like. Unit 26 should be attached to upright pipe extension 20 so as to maintain a heat conductive pathway between collector 32 and pipe extension 20. For example, unit 26 may be soldered to pipe 20 or attached thereto by similar known means. In such cases the means for attachment will form part of the conductive pathway between the receiver 32 and the heat distribution means, such as pipe extension 20.

Lens 36 has a focal length F and therefore gathers and focuses the sun's rays at a focal point a distance F away from the lens. The sun's rays are indicated here by arrows 40. Collector 32 is positioned at the focal point of lens 36. Collector 32 may be positioned closer to lens 36 than the focal point or it may be positioned further away. In these circumstances the solar radiation will not be sharply focussed onto the surface of collector 32, but it will still be received thereby and distributed so as to prevent an ice buildup. Collector 32 should not be disposed further than twice the focal length of lens 36 away therefrom.

As shown in the Figures, when lens 36 is spherical, collector 32 preferably has a configuration of a spherical segment having a radius equal to the focal length F of the lens 36 and is disposed so as to present a concave receiving surface for the focussed solar radiation. Thus, lens 36 will focus the available sunlight entering it onto the surface of collector 32 at all times. Collector 32 may have other configurations, such as a cylindrical configuration also. With these other configurations, the sunlight will not be as sharply focussed onto the surface of the collector as it is when a spherically configured collector is used. Preferably, collector 32 and upright pipe extension 20 are made of a strongly heat conductive material The material must be able to conduct the heat quickly so that it is not radiated into the outside environment and lost. Such materials include metals such as copper, brass, and aluminum. Copper is a preferred material because of its ability to rapidly conduct heat and because it is easily workable, relatively inexpensive, and readily available.

Lens unit 26 is attached to upright pipe 20 at an angle $\theta$ with respect to the horizon. Lens unit 26 should be attached so that means 36 confronts the sun's path across the sky during the winter months. Angle $\theta$ can be varied so as to achieve the maximum exposure of lens 36 to sunlight for a given latitude. For example, for a northerly latitude of approximately 48°, it has been found that an angle of about 22° degrees will provide a sufficient amount of exposure to solar radiation during winter months to keep the vent pipe 14 and pipe extension 20 substantially free of ice and frost accumulation in the cold weather temperatures In general, the angle $\theta$ should be no less than the angle of the sun above the horizon at midday of the winter solstice and no greater than the angle of the sun above the horizon at midday of the spring equinox.

With the shown embodiment then, the lens 36 will gather and focus the sun's rays onto receiver 32, which will collect the accumulated solar radiation as heat. Because collector 32 is chosen to be of a highly heat conductive material, such as copper, it rapidly conducts the heat away from the spot of focussed sunlight and within upright pipe extension 20. That is, heat is conducted away from the focal point of the solar radiation faster than it can be radiated away, thereby keeping the interior surface of upright pipe extension 20 above the freezing point of water. Maintaining the temperature of the interior surface of the pipe above the freezing point of water prevents ice and frost accumulation thereon and at the end 23 of upright pipe 20. Of course, during days when the weather is cloudy and the strong sunlight does not reach the apparatus, ice and frost may begin to accumulate within the pipe 20. As soon as the sunlight again penetrates strongly to the lens, however, the frost and ice will begin to dissipate.

Figure 3:
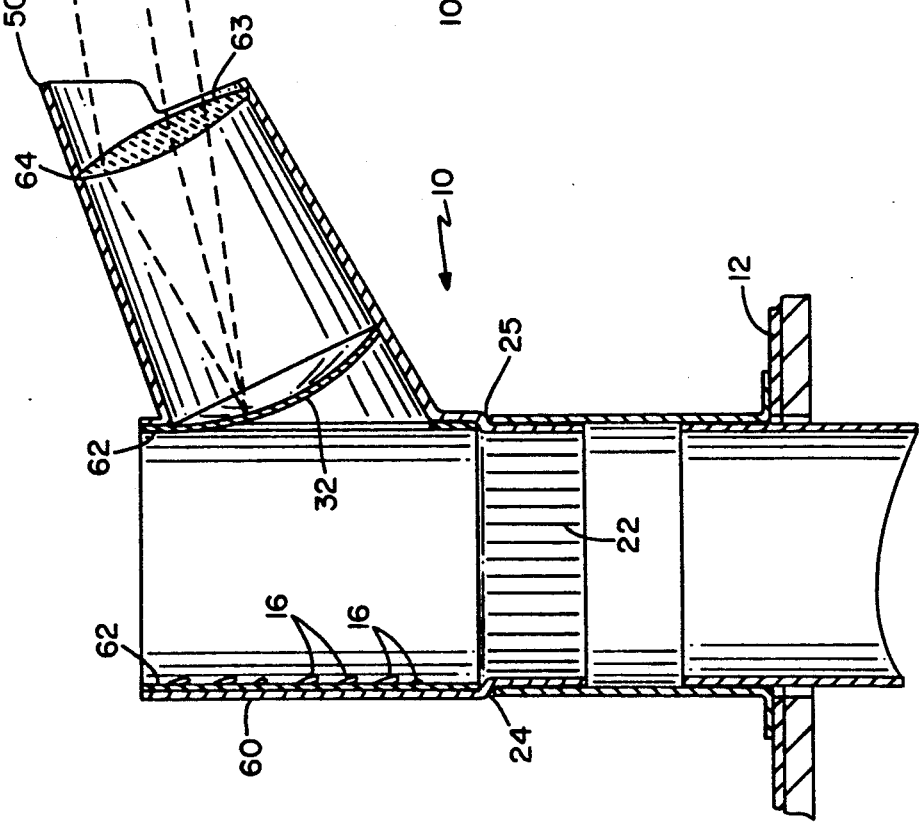
FIG. 3 illustrates an alternate embodiment of the present invention.

An alternative embodiment of the present invention is shown in FIG. 3. Thus, as shown therein, apparatus 10 comprises a plastic outer liner 60 encircling an inner heat conductive liner 62. In this embodiment, lens pipe 27 is also plastic and holds a lens 63 in place by a circumferentially extending detente 64 formed directly into the plastic lens pipe 27. Collector 32, which still comprises a highly heat conductive material such as copper, is heat conductively connected to inner heat conductive liner 62 so that heat may be rapidly conducted thereto from collector 32. In the embodiment shown in FIG. 3, lens pipe 27 and upright pipe extension 20 can be fabricated as a single unit with the copper liner 62, collector 32 and lens 63 installed thereafter. As shown, line 62 and collector 32 may be integral or they may be separate items heat conductively attached to each other.

FIG. 3 further illustrates how sun rays 40 may be focussed over many months onto collector 32 even when the sun's rays do not enter lens 63 parallel to the optical axis of the lens as shown in FIG. 2. Thus, apparatus 10 will function over a wide range of angular positions relative to the sun so as to receive and focus the available sunlight onto collector 32, in this manner achieving the desired end of keeping pipe 14 free of an obstructing ice or frost accumulation. Additionally, as seen in FIG. 1, the focal point 66 may vary across the surface of the collector as the position of the sun changes relative to lens unit 26. Thus the path of the focal point will be an arc across the surface of collector 32. Points 66, it will be understood, represent the location of the focal point on collector 32 at various points in time during the day. FIG. 3 further illustrates that lenses of varying focal lengths may be used with the present invention. Thus, lens 63 has a shorter focal length than lens 36.

Figure 4:
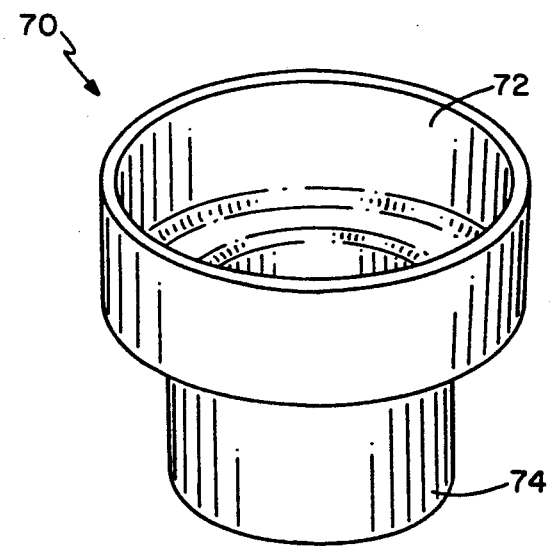
FIG. 4 depicts an adaptor useful in attaching the apparatus of FIG. 1 to different sizes of vent piping.

Apparatus 10 can be conveniently manufactured with upright pipe being a single size and then providing apparatus 10 with adapters such as adapter 70 shown in FIG. 4 so as to fit pipe 20 into a variety of different diameter roof vent pipes Thus adapter 58 has a first end 72 configured to receive lower end 21 of apparatus 10 and a second end 74 configured to be inserted into a vent pipe of a smaller diameter.

Thus with the present invention, an easily installed, low maintenance, affordable device has been provided to prevent ice and frost accumulation in a venting pipe. The present invention may be used in combination with any pipe that carries water in vapor or liquid phase, such as a gas furnace vent pipe, which carries water produced as a by-product of the combustion of the gas, or the small space heaters found in trailers and recreational vehicles.

Having thus described the present invention, other modifications, alterations, or substitutions may now suggest themselves to those skilled in the art, all of which are within the spirit and scope of the present invention. It is therefore intended that the present invention be limited only by the scope of the attached claims below.

What is claimed is:

1. An improved roof venting conduit, said conduit including a conduit heating apparatus for substantially preventing frost and ice blockage of said conduit, said conduit extending upwardly from a roof and being provided for venting sewers, gas furnaces or the like, said conduit heating apparatus providing heat to said conduit comprising:
  means for gathering and focussing solar radiation;
  means for receiving said focussed radiation as heat; and
  means for distributing the heat from the receiving means to said conduit.

2. The conduit of claim 1 wherein said gathering and focussing means is a convex lens having a focal length F.

3. The apparatus of claim 2 wherein said means for receiving includes a member having the configuration of a spherical segment of radius F.

4. The conduit of claim 3 wherein said member is disposed a distance less than 2F from said convex lens.

5. The apparatus of claim 2 wherein said lens is a spherical lens.

6. The conduit of claim 1 wherein said means for distributing comprises a heat conducting material disposed within said conduit.

7. The conduit of claim 1 wherein said means for distributing includes a heat conducting conduit extension attached to the conduit.

8. The conduit of claim 6 wherein said gathering and focussing means is a convex lens having a focal length F.

9. The conduit of claim 7 wherein said means for receiving includes a member having a configuration of a spherical segment of radius F.

10. The conduit of claim 9 wherein said member is disposed a distance less than 2F from said convex lens.

11. The conduit of claim 1 wherein said receiving means and said distribution means are heat conductively connected to each other.

12. The conduit of claim 1 wherein said means for gathering and focussing confronts the sun's path during the winter months.

13. An apparatus for substantially preventing frost and ice accumulation in a conduit containing water in vapor and droplet form, said apparatus comprising:
  an upright pipe connected to the conduit; and
  a lens unit including:
    a lens pipe;
    a collector disposed at one end of said lens pipe; and
    a lens having a focal length F disposed at the other end of said lens pipe, said lens and said collector being spaced no further apart than a distance 2F, said lens focussing sunlight onto said collector;
  wherein said lens unit is attached to said upright pipe such that said collector is in heat conducting relation to said upright pipe and wherein said apparatus is disposed on said conduit such that said lens receives light from the sun.

14. The apparatus of claim 13 wherein said lens has an optical axis and wherein said lens is disposed within said lens pipe such that the optical axis of said lens is substantially coincident with the axis of said lens pipe, and wherein said lens pipe is disposed at an angle $\theta$ with respect to the horizon, where $\theta$ is greater than the angle the sun makes with the horizon at midday on the winter solstice and less than the angle the sun makes with the horizon at midday on the spring equinox.

15. The apparatus of claim 14 and further including a lens holder for positioning said lens and located at said other end of said lens pipe, and wherein said lens holder includes a snow shade for said lens.

16. The apparatus of claim 13 where said collector comprises a member having a configuration of a spherical segment of radius F, said collector being disposed at said one end such that it presents a concave collecting surface to said lens.

17. The apparatus of claim 16 wherein said lens unit is sealed to prevent water from entering said unit.

18. The apparatus of claim 16 wherein said lens is disposed within said lens pipe such that the optical axis of said lens is substantially coincident with the axis of said lens pipe, and wherein said lens pipe is disposed at an angle $\theta$ with respect to the horizon, where $\theta$ is greater than the angle the sun makes with the horizon at midday on the winter solstice and less than the angle the sun makes with the horizon at midday on the spring equinox.

19. The apparatus of claim 16 wherein the conduit is a roof venting conduit provided for venting sewers, gas furnaces or the like.

20. The apparatus of claim 13 wherein said lens unit is attached to said upright pipe such that said collector is disposed in the interior of said upright pipe.

21. The apparatus of claim 20 where said collector comprises a member having a configuration of a spherical segment of radius F, said collector being disposed at said one end such that it presents a concave collecting surface to said lens.

22. The apparatus of claim 20 wherein said lens unit is sealed to prevent water from entering said unit.

23. The apparatus of claim 20 wherein said lens is disposed within said lens pipe such that the optical axis of said lens is substantially coincident with the axis of said lens pipe, and wherein said lens pipe is disposed at an angle $\theta$ with respect to the horizon, where $\theta$ is greater than the angle the sun makes with the horizon at midday on the winter solstice and less than the angle the sun makes with the horizon at midday on the spring equinox.

24. The apparatus of claim 20 wherein the conduit is a roof venting conduit provided for venting sewers, gas furnaces or the like.

25. The apparatus of claim 13 wherein the conduit is a roof venting conduit provided for venting sewers, gas furnaces or the like.

26. An apparatus for substantially preventing frost and ice accumulation in a roof conduit that vents water in vapor and droplet form from sewers, gas furnaces, or the like, said apparatus comprising:
  an upright conduit connected to the roof conduit; and
  a heat collection unit including:
    a pipe;
    a heat collector disposed at one end of said pipe; and
    means for passing and focussing sunlight therethrough disposed at the other end of said pipe, said means passing sunlight therethrough and focussing it onto said collector;
  wherein said heat collection unit is attached to said upright conduit such that said collector is in heat transferring relation to said upright conduit and wherein said apparatus is disposed on said roof conduit such that said means receives light from the sun and transfers it to said collector.

27. The apparatus of claim 26 wherein said means has an optical axis and wherein said means is disposed within said pipe such that the optical axis of said means is substantially coincident with the axis of said pipe, and wherein said pipe is disposed at an angle θ with respect to the plane of the horizon, where θ is greater than the angle the sun's light makes with the plane of the horizontal at midday on the winter solstice and less tan the angle the sun's light makes with the plane of the horizon at midday on the vernal equinox.

28. The apparatus of claim 27 and further including a holder for positioning said means and located at said other end of said pipe, and wherein said holder includes a snow shade for said means.

29. The apparatus of claim 26 where said collector comprises a member having substantially the configuration of a spherical segment having a predetermined radius, said collector being disposed at said one end such that it presents a concave collecting surface to said means.

30. The apparatus of claim 29 wherein said means and said collector are spaced no further apart than twice said predetermined radius.

31. The apparatus of claim 29 wherein said unit is sealed to prevent water from entering said unit.

32. The apparatus of claim 29 wherein said means has an optical axis and is disposed within said pipe such that the optical axis of said means is substantially coincident with the axis of said pipe, and wherein said pipe is disposed at an angle θ with respect to the plane of the horizon, where θ is greater than the angle the sun's light makes with the plane of the horizon at midday on the winter solstice and less than the angle the sun's light makes with the plane of the horizon at midday on the vernal equinox.

33. The apparatus of claim 26 wherein said unit is attached to said upright conduit such that said collector is positioned in the interior of said upright conduit.

34. The apparatus of claim 33 where said collector comprises a member having a configuration substantially that of a spherical segment of radius F, said collector being disposed at said one end such that it presents a concave heat collecting surface to said means.

35. The apparatus of claim 33 wherein said unit is sealed to prevent water from entering said unit.

36. The apparatus of claim 33 wherein said means has an optical axis and is disposed within said pipe such that the optical axis of said means is substantially coincident with the axis of said pipe, sand wherein said pipe is disposed at an angle θ with respect to the plane of the horizon, where θ is greater than the angle the sun's light makes with the horizon at midday on the winter solstice and less than the angle the sun's light makes with the plane of the horizon at midday on the vernal equinox.

* * * * *

UNITED STATES PATENT AND TRADEMARK OFFICE
CERTIFICATE OF CORRECTION

PATENT NO. : 5,129,387
DATED : July 14, 1992
INVENTOR(S) : Walter R. Behrens It is certified that error appears in the above-identified patent and that said Letters Patent is hereby corrected as shown below:

In col. 1, line 22, after the word "function", add --.--.

In Col. 1, line 26, after the word "indoors", add --.--.

In Col. 2, Line 7, after the word "extends", add --.--.

In Col. 5, Claim 3, line 14, delete the word "apparatus" and insert the word --conduit-- therefor.

In Col. 5, Claim 5, line 19, delete the word "apparatus" and insert the word --conduit-- therefor.

In Col. 8, Claim 36, line 20, delete the word "sand", and insert the word --and-- therefor.

In Col. 5, claim 8, line 27, delete "6" and substitute --7-- therefor.

In. Col. 5, Claim 9, line 30, delete "7" and substitute --8-- therefor.

Signed and Sealed this

Nineteenth Day of October, 1993

Attest:

BRUCE LEHMAN

*Attesting Officer*    *Commissioner of Patents and Trademarks*